(12) United States Patent
Owen

(10) Patent No.: US 7,419,087 B2
(45) Date of Patent: Sep. 2, 2008

(54) COLLECTION DEVICE AND METHOD

(75) Inventor: Loyd E. Owen, Kansas City, MO (US)

(73) Assignee: Starco, LLC, Kansas City, MO (US)

( * ) Notice: Subject to any disclaimer, the term of this patent is extended or adjusted under 35 U.S.C. 154(b) by 310 days.

(21) Appl. No.: 11/196,007

(22) Filed: Aug. 3, 2005

(65) Prior Publication Data

US 2007/0029372 A1 Feb. 8, 2007

(51) Int. Cl.
*B65G 11/04* (2006.01)

(52) U.S. Cl. ...................... 232/44; 232/43.2; 220/908.3

(58) Field of Classification Search ............ 232/30–32, 232/44, 45, 43.2, 43.5, 38, 19; 220/908, 220/908.3, 908.1, 909; D99/28–29
See application file for complete search history.

(56) References Cited

U.S. PATENT DOCUMENTS

| | | | |
|---|---|---|---|
| 336,052 A * | 2/1886 | Jovine | 232/32 |
| 407,870 A * | 7/1889 | Moore et al. | 232/30 |
| 572,893 A * | 12/1896 | Hentz | 232/30 |
| 686,328 A * | 11/1901 | Plank | 232/32 |
| 934,245 A * | 9/1909 | Viezzi | 232/32 |
| 1,058,419 A * | 4/1913 | Frediani | 232/53 |
| 1,125,584 A * | 1/1915 | Mela | 232/32 |
| 1,550,597 A * | 8/1925 | Viezzi | 232/32 |
| 2,792,171 A | 5/1957 | Rosset | |
| 3,554,345 A | 1/1971 | Mullens | |
| 4,013,215 A | 3/1977 | Mercier | |
| 4,367,844 A * | 1/1983 | Drummond | 232/17 |
| 4,827,415 A * | 5/1989 | Gudat et al. | 701/49 |
| 4,892,224 A | 1/1990 | Graham | |
| 4,946,118 A | 8/1990 | Hastings | |
| 4,987,988 A | 1/1991 | Messina | |
| 5,007,581 A | 4/1991 | Douglas | |
| 5,695,114 A | 12/1997 | Evans | |
| 5,806,759 A | 9/1998 | Axisa | |
| 6,293,409 B1 | 9/2001 | Aykin | |
| 6,409,589 B1 * | 6/2002 | Laconico et al. | 453/17 |
| 6,439,517 B1 | 8/2002 | Applegate | |
| 6,719,195 B2 * | 4/2004 | Farentinos | 232/45 |
| 7,318,548 B2 * | 1/2008 | Felice et al. | 232/45 |

* cited by examiner

*Primary Examiner*—William L. Miller
(74) *Attorney, Agent, or Firm*—Lathrop & Gage LC

(57) ABSTRACT

A collection device comprises a shell and an outlet structure. The shell has top and bottom ends, front and rear sides, and left and right sides. The front side defines a front opening, the bottom end defines a lower opening, and an interior cavity connects the front and lower openings. The outlet structure extends downwardly from the shell and has a top end defining an upper opening and a bottom end defining an exit. The outlet structure top end attaches to the shell bottom end and encircles the shell lower opening. An interior cavity connects the outlet structure upper opening and the outlet structure exit. The outlet structure interior cavity is in communication with the shell interior cavity to allow items to pass between the shell front opening and the outlet structure exit. A method of discarding waste using a collection device is provided.

25 Claims, 10 Drawing Sheets

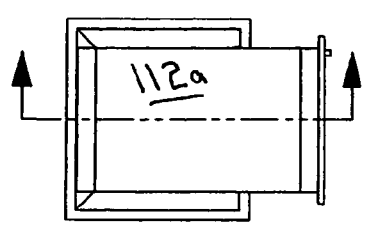
FIG. 9
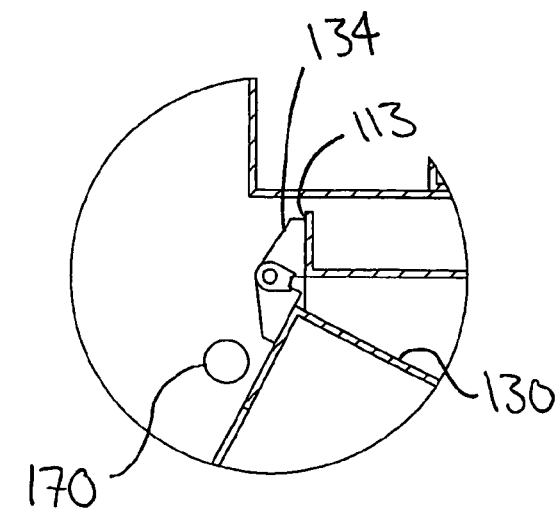
FIG. 11
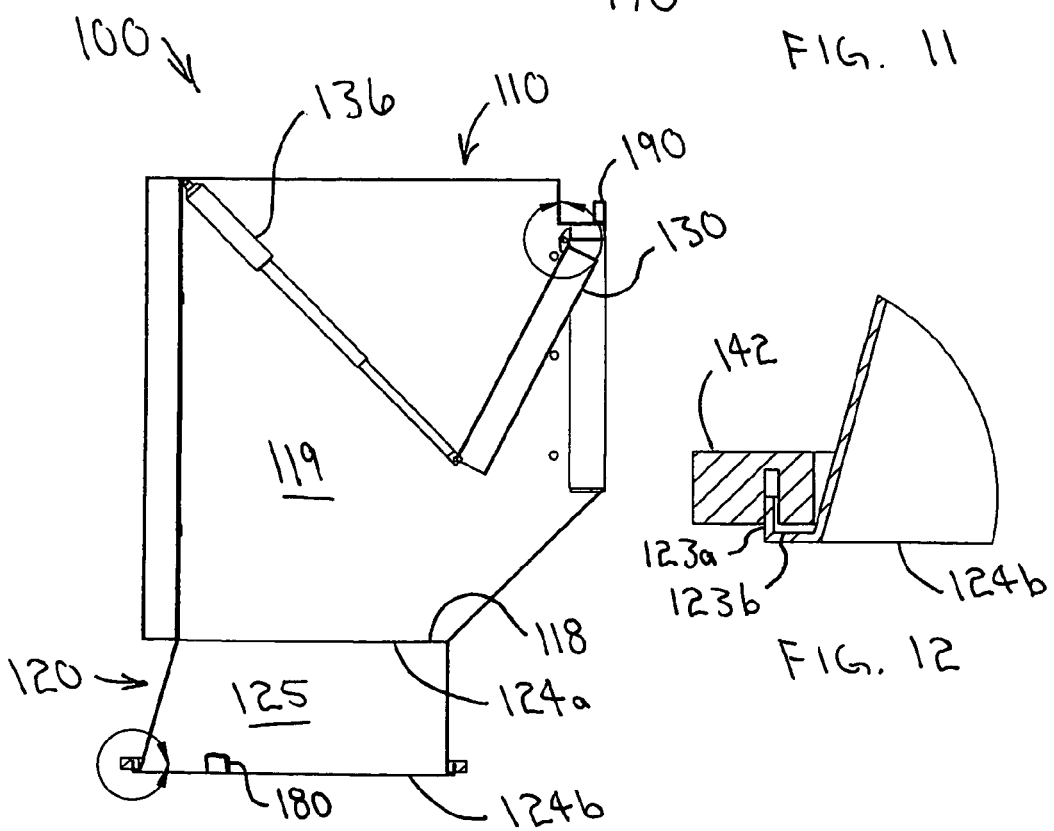
FIG. 10
FIG. 12

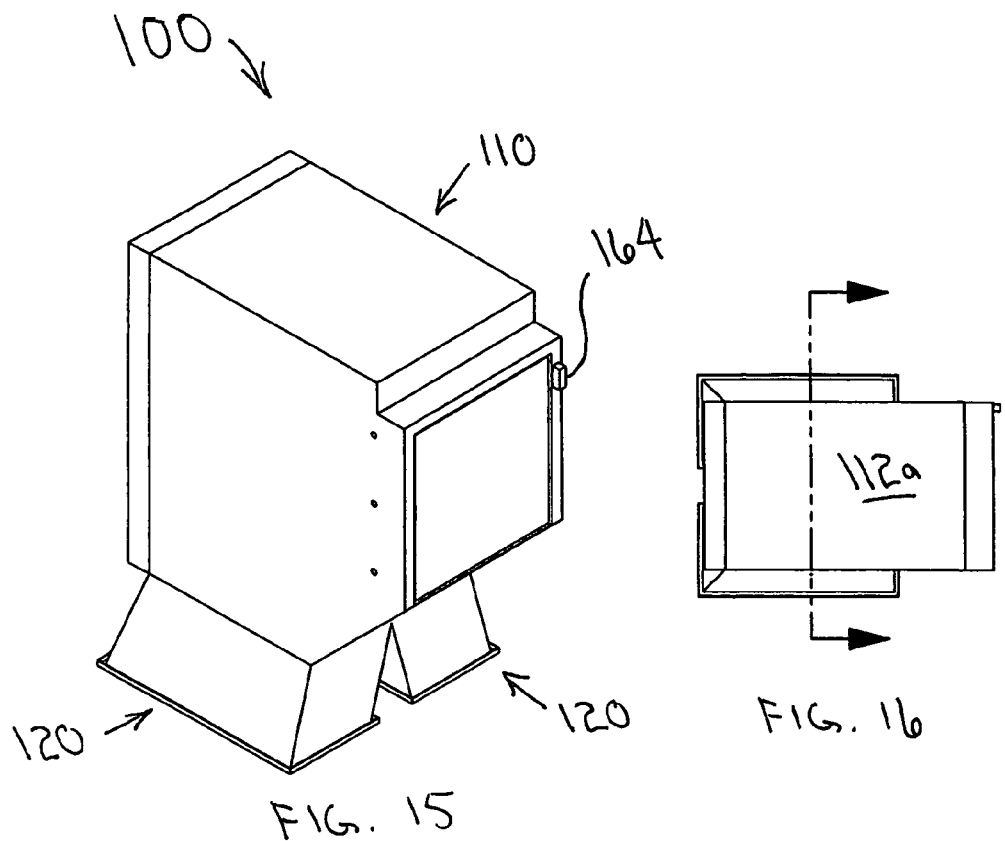
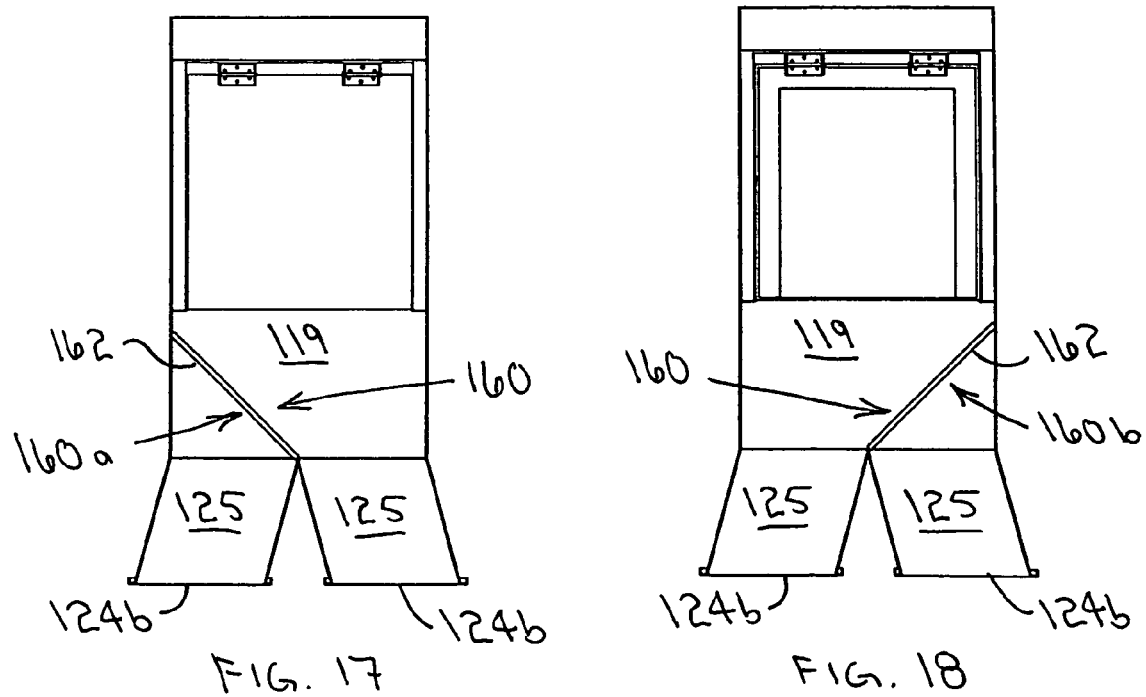

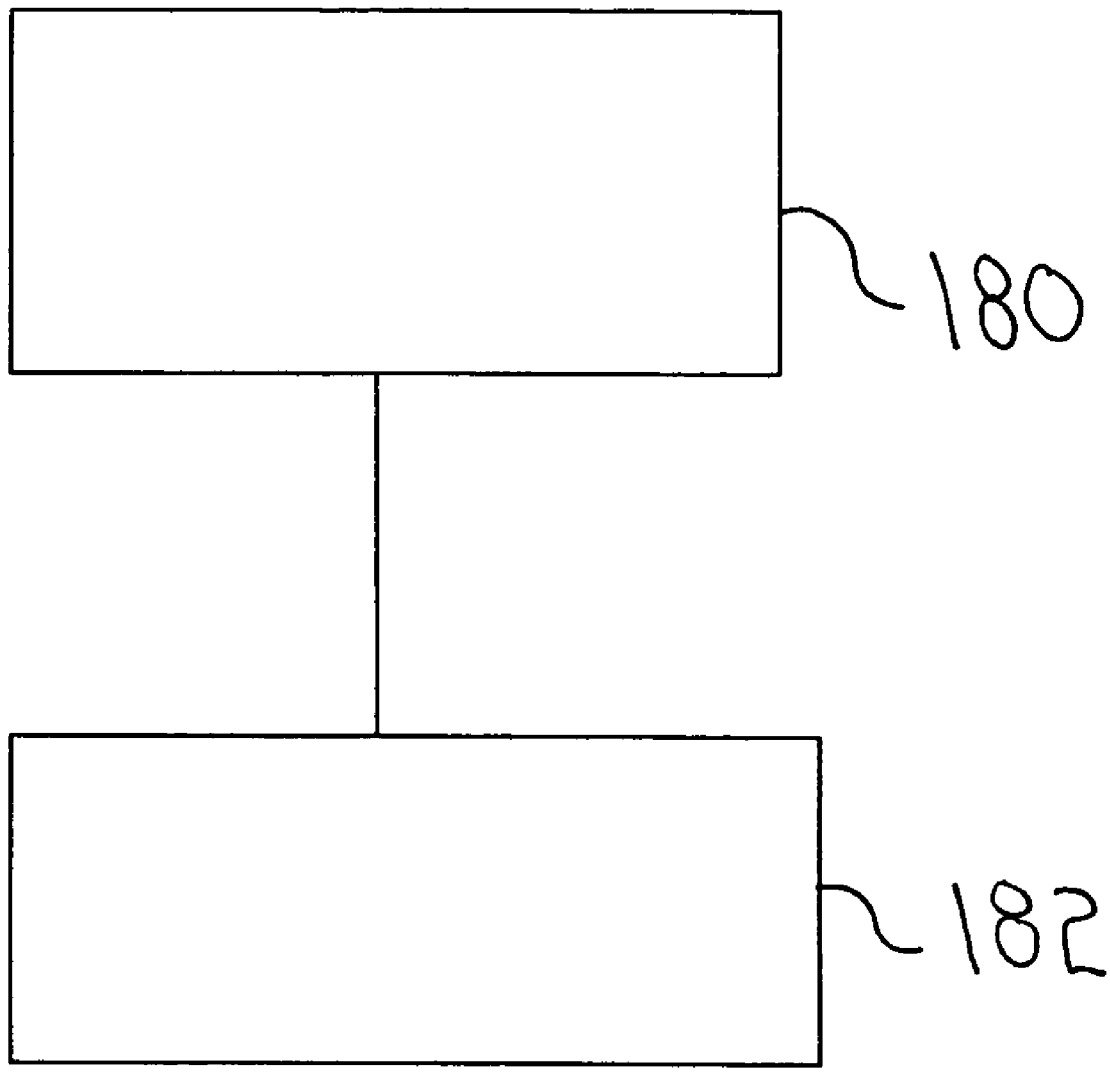

US 7,419,087 B2

COLLECTION DEVICE AND METHOD

BACKGROUND AND SUMMARY OF THE INVENTION

This invention relates generally to a collection device and a method of discarding waste from a countertop in a first room to a remote room.

Garbage cans and waste baskets often occupy precious storage space and can create foul-smelling odors when filled with discarded waste. Further, prior art methods of securing trash bags have proven inadequate, the prior art is lacking means to alert a user that a trash bag is full, and the prior art is not truly integrated into a room. The collection device and method disclosed herein provide a convenient solution to these problems and others.

A collection device according to the present invention comprises a shell and an outlet structure. The shell has top and bottom ends, opposed front and rear sides, and opposed left and right sides. The front side defines a front opening, the shell bottom end defines a lower opening, and an interior cavity connects the front opening and the lower opening to allow items to pass from the front opening to the lower opening. The outlet structure has top and bottom ends and extends downwardly from the shell. The outlet structure top end is attached to the shell bottom end and encircles the shell lower opening. The outlet structure top end defines an upper opening, the outlet structure bottom end defines an exit, and an interior cavity connects the outlet structure upper opening and the outlet structure exit to allow items to pass between the outlet structure upper opening and the outlet structure exit. The outlet structure interior cavity is in communication with the shell interior cavity to allow items to pass between the shell front opening and the outlet structure exit.

A method of discarding waste from a countertop in a first room to a remote room comprises a plurality of steps. In a first step, a collection device is provided that includes a shell, an outlet structure, and a door. The shell has opposed top and bottom ends, opposed front and rear sides, and opposed left and right sides. The front side defines a front opening, the shell bottom end defines a lower opening, and an interior cavity connects the front opening and the lower opening to allow items to pass from the front opening to the lower opening. The left and right sides each define a plurality of pilot holes for allowing the left and right shell sides to be easily attached to a wall. The outlet structure has top and bottom ends and extends downwardly from the shell. The outlet structure top end is attached to the shell bottom end and encircles the shell lower opening. The outlet structure top end defines an upper opening, the outlet structure bottom end defines an exit, and an interior cavity connects the outlet structure upper opening and the outlet structure exit to allow items to pass between the outlet structure upper opening and the outlet structure exit. The outlet structure interior cavity is in communication with the shell interior cavity to allow items to pass between the shell front opening and the outlet structure exit. The door is attached to the shell for selectively closing the shell front opening. In another step, the left and right shell sides are aligned with a wall. In another step, a bottom surface of the shell front opening is aligned with a top of the countertop. In another step, the left and right shell sides are coupled to the wall using fasteners. Each fastener has a configuration complementary to a configuration of a respective pilot hole. In another step, the door is opened. In another step, waste is slid from the countertop into the shell interior cavity.

BRIEF DESCRIPTION OF THE DRAWINGS

FIG. 9 shows a top view of the collection device as in FIG. 1 with the trim piece attached and the hoop in a second position.

FIG. 10 shows a sectional view of the collection device as in FIG. 9 with a pneumatic cylinder attached to the door.

FIG. 11 shows a sectional view of the hinge as in FIG. 10.

FIG. 12 shows a sectional view of the collection device as in FIG. 10 with the hoop in a second position.

FIG. 15 shows a perspective view of the collection device as in FIG. 1 with a plurality of outlet structure interior cavities and a switch.

FIG. 16 shows a top view of the collection device as in FIG. 15.

FIG. 17 shows a sectional view of the collection device as in FIG. 16 with a diverter in a first configuration.

FIG. 18 shows a sectional view of the collection device as in FIG. 16 with the diverter in a second configuration.

FIG. 20 is a block diagram that shows a sensor connected to an alarm.

DESCRIPTION OF THE PREFERRED EMBODIMENT

Figure 1:
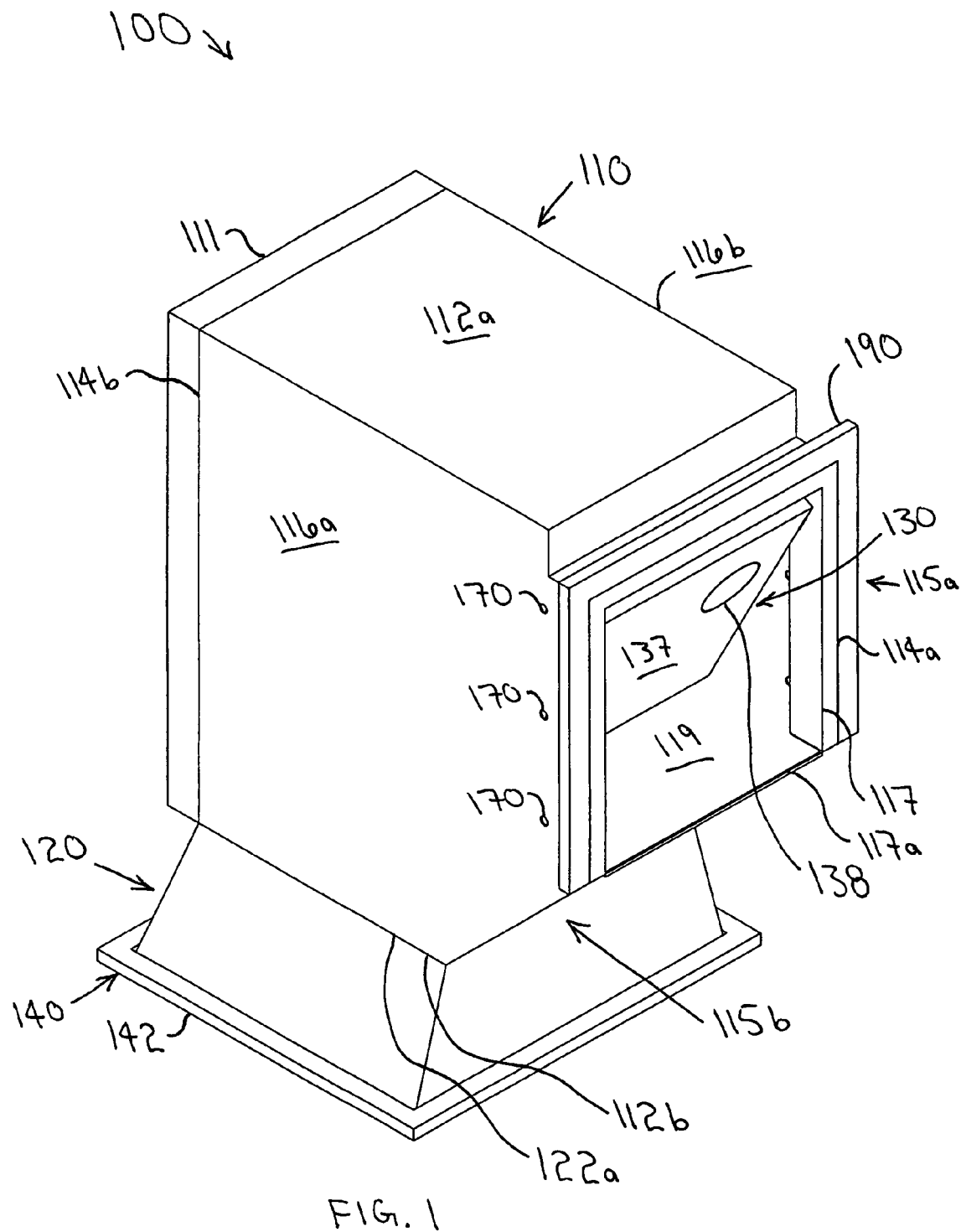
FIG. 1 shows a perspective view of a collection device with a trim piece and rear side attached.

A collection device 100 according to the present invention will now be described in detail with reference to FIGS. 1-20 of the accompanying drawings. More particularly, a collection device 100 for installation in a wall 10 between adjacent rooms includes a shell 110 and an outlet structure 120.

The shell 110 has opposed top 112a and bottom ends 112b, opposed front 114a and rear sides 114b, and opposed left 116a and right sides 116b. The front side 114a defines a front opening 117, and the bottom end 112b defines a lower opening 118. The front opening 117 and the lower opening 118 are connected by an interior cavity 119 for allowing the passage of items therebetween. The shell front side 114a preferably has a vertical portion 115a and an angled portion 115b; the front side vertical portion 115a preferably defines the front opening 117.

Figure 2:
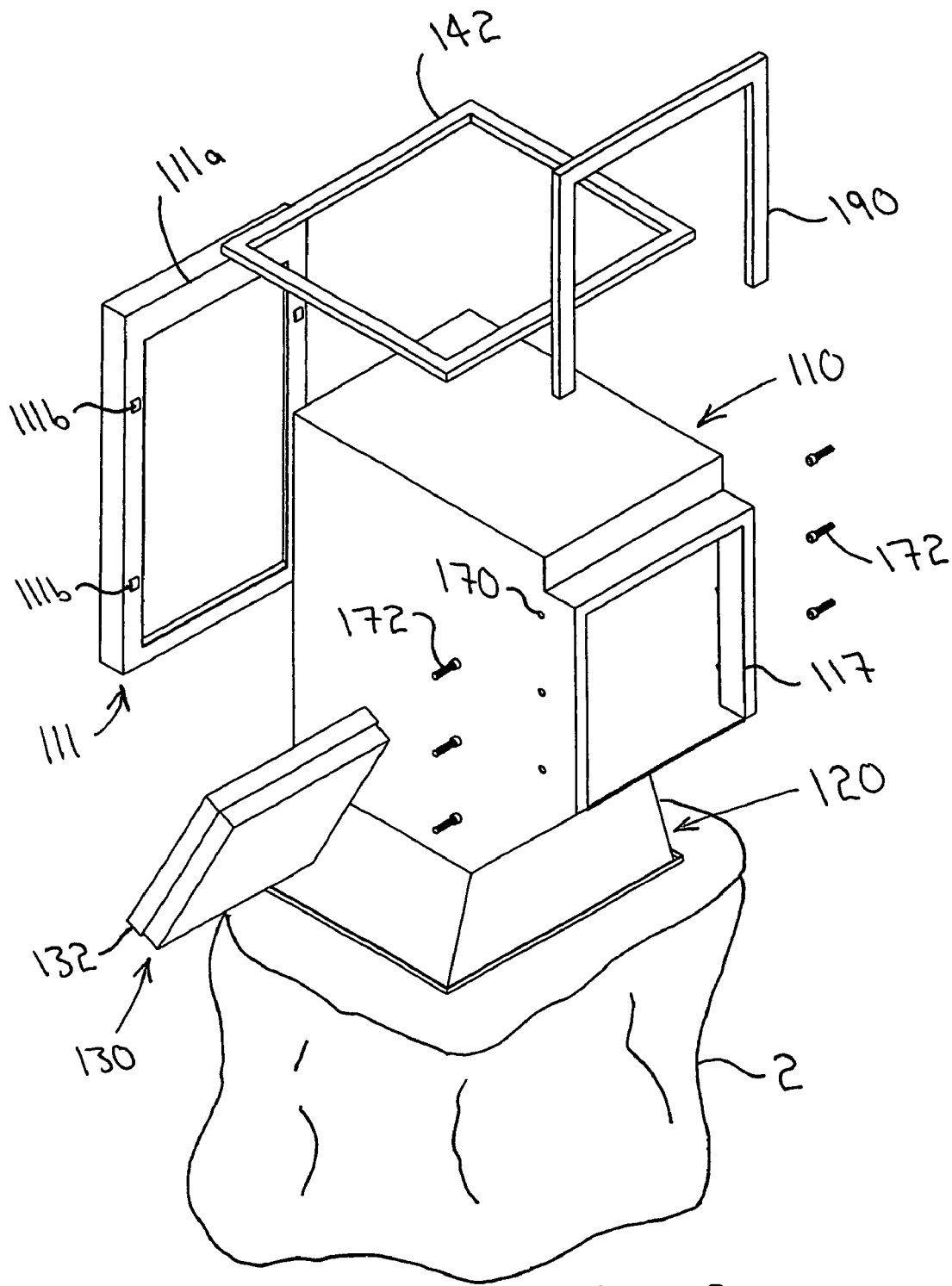
FIG. 2 shows an exploded view of the collection device as in FIG. 1.
Figure 3:
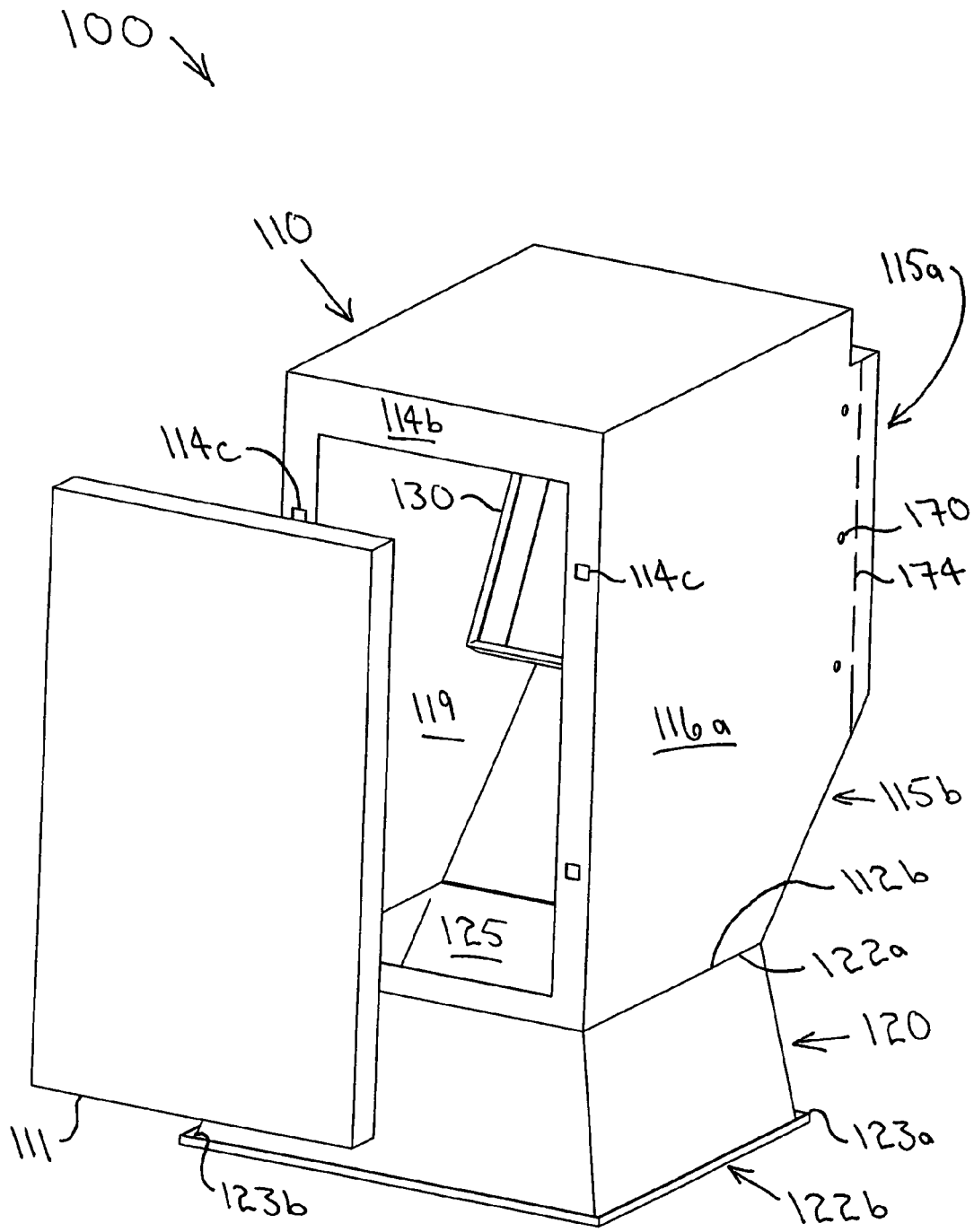
FIG. 3 shows a perspective view of the collection device as in FIG. 1 with the rear side removed.

The shell rear side 114b preferably includes a detachable portion 111 so the interior cavity 119 may be easily accessed and the shell 110 may be thoroughly cleaned. An interior surface 111a of the detachable portion 114c may define a plurality of hooks 111b (FIG. 2), and the shell rear side 114b may define a plurality of apertures 114c (FIG. 3). Each hook 111b preferably has a configuration complementary to a configuration of a respective aperture 114c for selective engagement therewith to allow the detachable portion to be selectively engaged to the shell rear side 114b. Other methods of connecting the shell rear side 114b and the detachable portion 111 may also be used, however.

The left and right sides 116a, 116b of the shell 110 each define a plurality of pilot holes 170, and a plurality of fasteners 172 having configurations complementary to configurations of the pilot holes 170 are included for connecting the shell 110 to the wall 10. Indicia 174 is preferably located on the left and right shell sides 116a, 116b for aligning the left and right shell sides 116a, 116b with the wall 10. As shown in FIG. 3, the indicia 174 are preferably lines that are parallel to the shell front side vertical portion 115a and are preferably spaced between ⅜ inch and 1 inch from the shell front side vertical portion 115a.

The outlet structure 120 extends downwardly from the shell 110 and has top 122a and bottom ends 122b. The outlet structure top end 122a is attached to the shell bottom end 112b and encircles the lower opening 118 of the shell 110. The outlet structure 120 top end 122a defines an upper opening 124a, and the outlet structure 120 bottom end 122b defines an exit 124b. The upper opening 124a and exit 124b are connected by an interior cavity 125 for allowing the passage of items therebetween. The outlet structure interior cavity 125 is in communication with the shell interior cavity 119 for allowing the passage of items between the shell front opening 117 and the outlet structure exit 124b.

Figure 6:
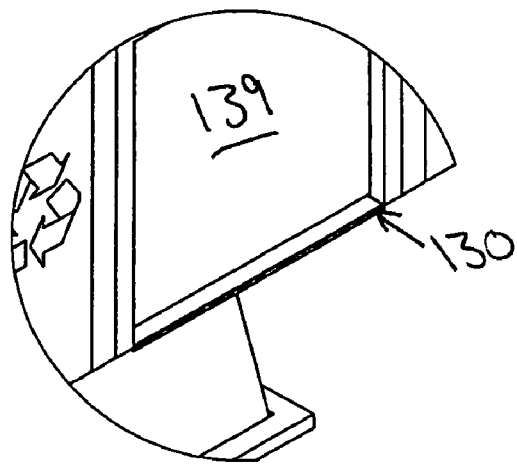
FIG. 6 shows a sectional view of the collection device as in FIG. 5 and shows a door having a recess.
Figure 7:
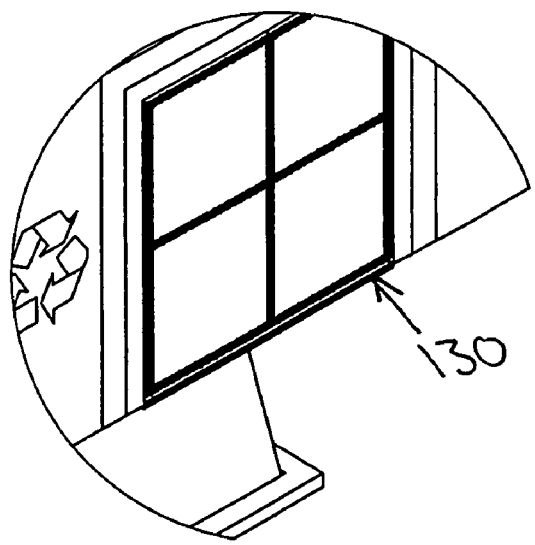
FIG. 7 shows a sectional view of the collection device as in FIG. 5 and shows the door with a tile finishing material.
Figure 8:
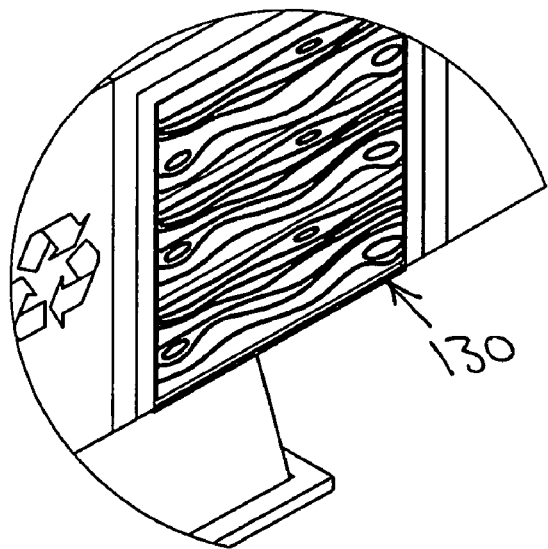
FIG. 8 shows a sectional view of the collection device as in FIG. 5 and shows the door with a wood finishing material.

A door 130 is preferably attached to the shell 110 for selectively closing the shell front opening 117, and a stopper 132 preferably encircles the door 130 to selectively seal the door 130 to the shell front side 114a. As shown in FIGS. 6-8, a front surface 137 of the door 130 may define a recessed area 139 so that a finishing material may be installed in the recessed area 139. By installing a finishing material that matches the surroundings of the collection device 100, the collection device may be truly integrated into a room. The stopper 132 is preferably rubber, though other materials may be used.

The door 130 may be attached to the shell 110 in various manners. One method of attaching the door 130 to the shell 110 includes connecting a hinge 134 to an interior surface 113 of the shell top end 112a and an interior surface 131 of the door 130. Attached in this way, the door 130 may selectively pivot about the hinge 134 and selectively close the shell front opening 117.

A pneumatic cylinder 136 or another actuating device may be connected to the shell top end interior surface 113 and the door interior surface 131 for causing the door 130 to selectively pivot about the hinge 134. Further, a sensor 138 may be in communication with the pneumatic cylinder 136 to selectively actuate the pneumatic cylinder 136 and cause the door 130 to pivot about the hinge 134. The sensor 138 is preferably a proximity sensor or a motion sensor.

Figure 4:
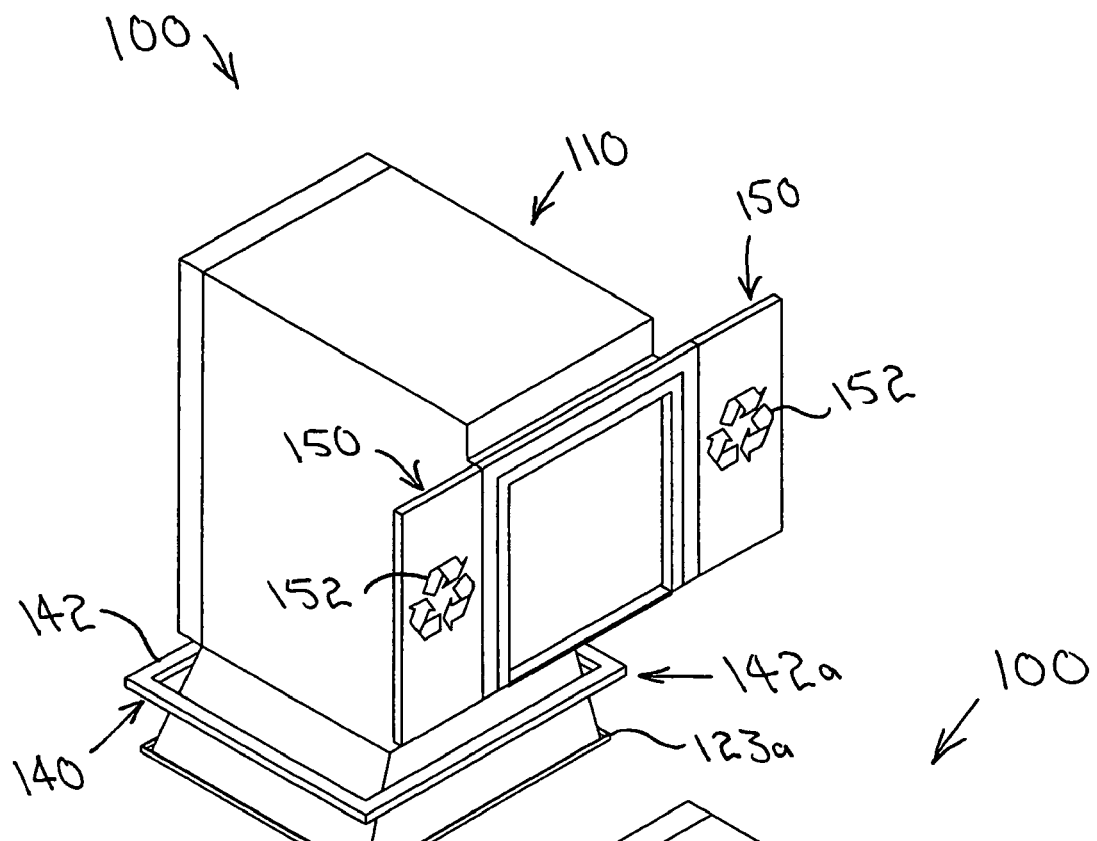
FIG. 4 shows a perspective view of the collection device as in FIG. 1 with a hoop in a first position and a splashguard attached.

The collection device 100 preferably includes means 140 for selectively attaching a bag 2 to the outlet structure 120. As shown in FIGS. 2-4, the outlet structure bottom end 122b may have an upwardly-protruding lip 123a that forms a groove 123b, and the outlet structure bottom end 122b preferably has a perimeter that is larger than the perimeter of the outlet structure top end 122a. A hoop 142 encircles the outlet structure 120 in one embodiment (FIG. 4), and is movable between a first position 142a in which the hoop 142 is separate from the groove 123b (FIG. 4) and a second position 142b in which the hoop 142 is received in the groove 123b (FIG. 5) for selectively ensnaring the bag 2 between the hoop 142 and the groove 123b.

Figure 13:
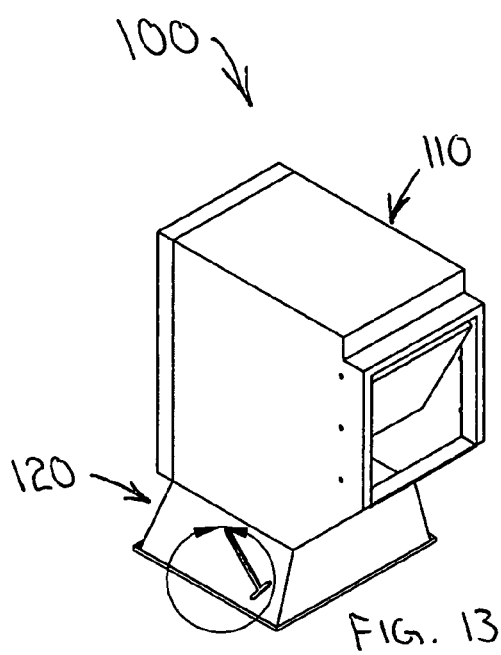
FIG. 13 shows a perspective view of the collection device as in FIG. 1 with a pivoting lever attached.
Figure 13A:
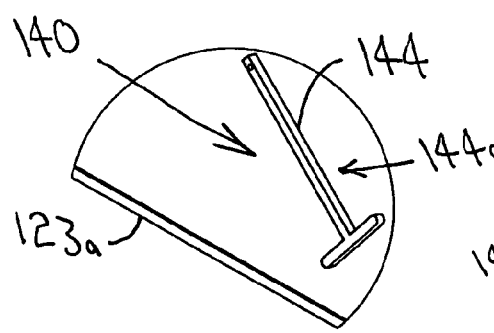
FIG. 13a shows a sectional view of the collection device as in FIG. 13 with the pivoting lever in a first position.
Figure 13B:
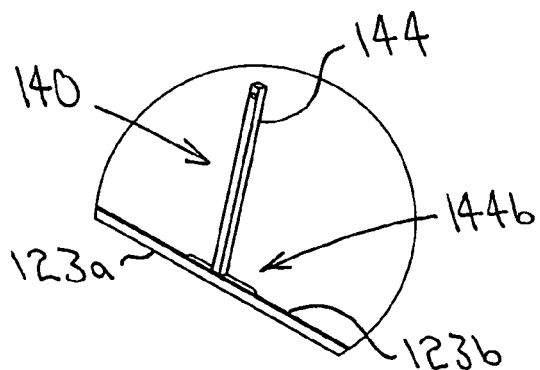
FIG. 13b shows a sectional view of the collection device as in FIG. 13 with the pivoting lever in a second position.

As shown in FIG. 13-13b, the means 140 may alternately include a pivoting lever 144 attached to the outlet structure 120. The pivoting lever 144 is preferably pivotable between a first position 144a in which the pivoting lever 144 is separate from the groove 123b (FIG. 13a) and a second position 144b in which the pivoting lever 144 is entrapped in the groove 123b for selectively ensnaring the bag 2 between the pivoting lever 144 and the groove 123b (FIG. 13b).

Figure 14:
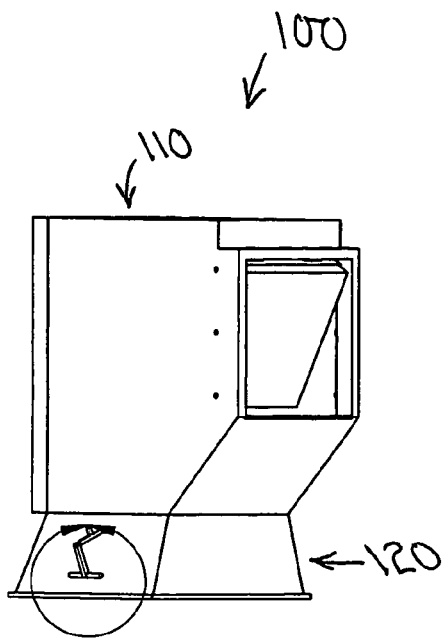
FIG. 14 shows a perspective view of the collection device as in FIG. 1 with a lever attached.
Figure 14A:
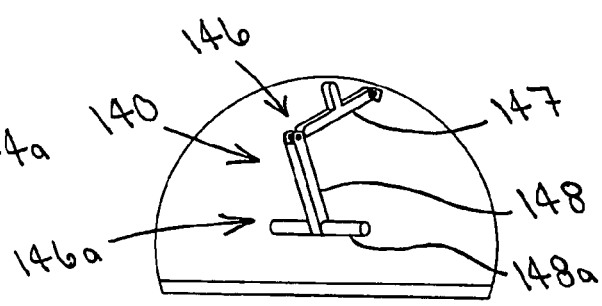
FIG. 14a shows a sectional view of the collection device as in FIG. 14 with the lever in a first position.
Figure 14B:
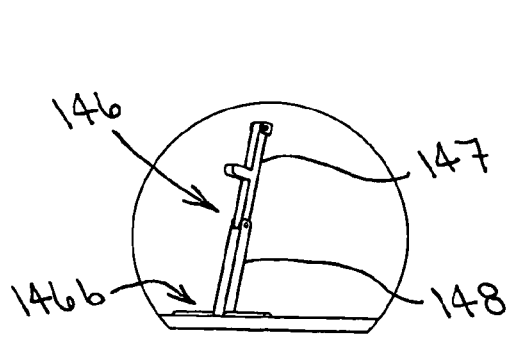
FIG. 14b shows a sectional view of the collection device as in FIG. 14 with the lever in a second position.

As shown in FIGS. 14-14b, the means 140 may alternately include a lever 146 pivotably attached to the outlet structure 120. The lever 146 preferably has an upper portion 147 rotatably attached to a lower portion 148 and is movable between a first position 146a in which the bottom surface 148a of the lower portion 148 is separate from the groove 123b (FIG. 14a) and a second position 146b in which the lower portion bottom surface 148a is received in the groove 123b for selectively ensnaring a bag 2 between the lower portion bottom surface 148a and the groove 123b (FIG. 14b).

A sensor 180 may be positioned in the shell interior cavity 119 or the outlet structure interior cavity 125 for sensing when the attached bag 2 is full. An alarm 182 is preferably in communication with the sensor 180 for signaling when the bag is full (FIG. 20). The alarm 182 may provide visual and/or audible indications. While the sensor 180 is preferably an infrared proximity sensor, ranging sensors and other sensors may also be used.

Figure 5:
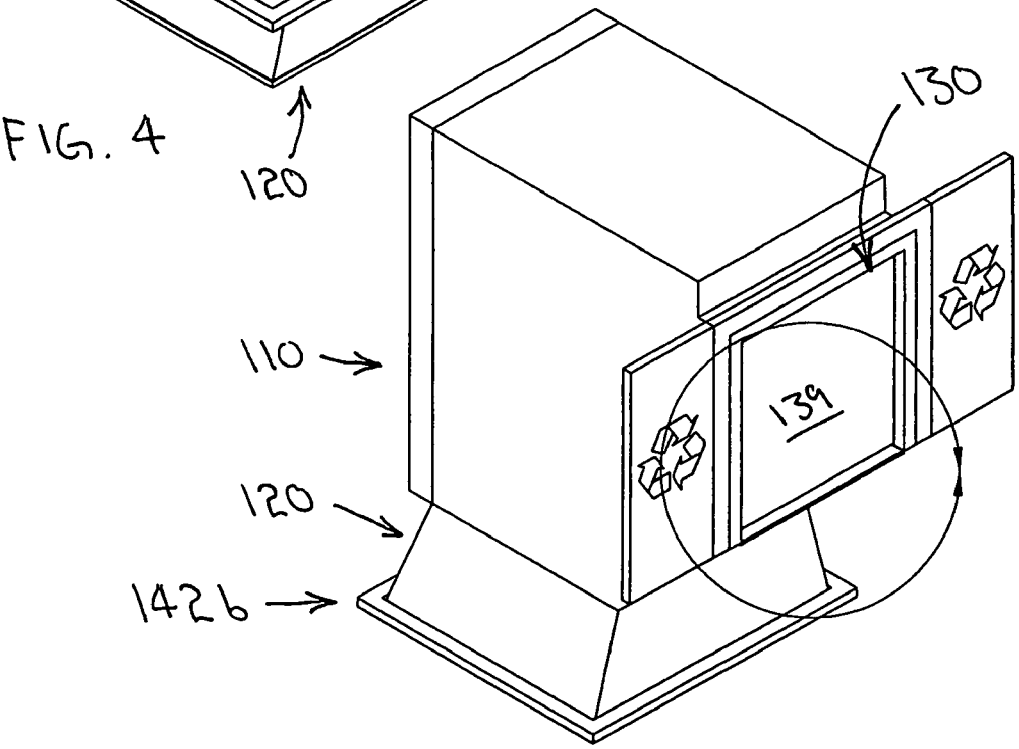
FIG. 5 shows a perspective view of the collection device as in FIG. 4 with the hoop in a second position.
Figure 19:
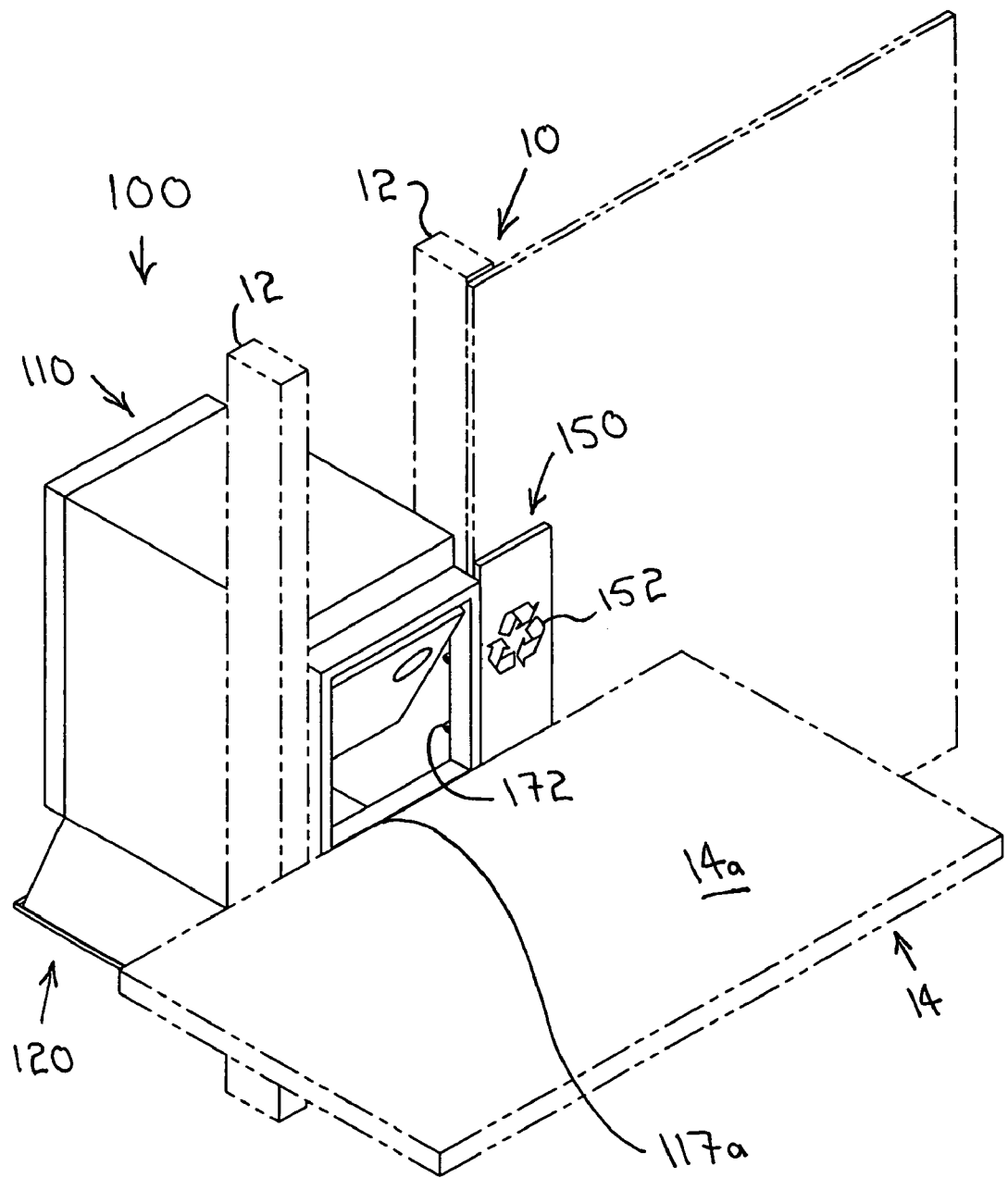
FIG. 19 shows a perspective view of the collection device as in FIG. 1 installed in a wall between wall studs and set against a countertop with the splashguard attached.

One or more splashguards 150 may be placed laterally adjacent the shell front side vertical portion 115a for shielding the wall 10, as shown in FIGS. 4, 5, and 19. Each splashguard 150 may be stainless steel or another metal and may include indicia 152 engraved by laser etching. Alternately, the splashguard 150 may include another material, such as tile, to blend in with the wall 10.

A trim piece 190 having a configuration complementary to a configuration of the shell front side vertical portion 115a may be included for integrating the shell front side vertical portion 115a with the wall 10. The trim piece 190 may be particularly useful if the collection device 100 is retrofitted into the wall 10 since the trim piece 190 can cover a gap between the shell 110 and the wall 10, and it may also be useful if the wall is being finished around the shell 110 since the wall 10 would not have to be perfectly finished.

Another embodiment of the collection device 100 is shown in FIGS. 15-18. According to this embodiment, the outlet structure 120 defines a plurality of separate interior cavities 125 that each end at a respective outlet structure exit 124b, with each outlet structure interior cavity 125 being in selective communication with the shell interior cavity 119. This allows an item to pass between the shell front opening 117 and a chosen outlet structure exit 124b. A diverter 160 has an upright wall 162 selectively movable between first and second configurations 160a, 160b and a switch 164 in communication with the upright wall 162 for selectively moving the upright wall 162 between the first and second configurations 160a, 160b. The first diver configuration 160a provides access to one of the outlet structure cavities 125 from the shell interior cavity 119, and the second diverter configuration 160b provides access to another of the outlet structure cavities 125 from the shell interior cavity 119.

In use, the collection device 100 is first installed in a wall 10 between adjacent rooms, such as a kitchen and a garage, for example. The indicia 174 on the left and right shell sides 116a, 116b may be respectfully aligned with studs 12 adjacent the shell 110, or the shell vertical portion 115a may be aligned with a finished surface of the wall 10. A bottom surface 117a of the shell front opening 117 may be aligned with a top surface 14a of a countertop. The fasteners may then be inserted through the pilot holes 170, coupling the shell 110 to the wall 10. One or more splashguards 150 and/or the trim piece 190 may be positioned adjacent the shell front side vertical portion 115a, covering imperfections in the wall 10 and protecting the wall 10. A finishing material, such as tile (FIG. 7) or wood (FIG. 8) may be installed in the door recessed area 139.

The bag 2 may be connected to the outlet structure 120 using the means 140 as described above.

The door 130 may be opened manually by pushing against it, causing the door 130 to pivot about the hinge 134, or by causing the sensor 138 to actuate the pneumatic cylinder 136. Actuating the pneumatic cylinder 136 also causes the door 130 to rotate about the hinge 134. While the door 130 is open, items may be tossed through the front opening 117 or may be slid from the countertop 14 through the front opening 117. After passing through the front opening 117, the items travel through the shell interior cavity 119 and then the connected outlet structure interior cavity 125 due to gravity. When the items pass through the outlet structure exit 124b, they may fall to the attached bag 2. The sensor 180 may detect when the bag 2 is full and appropriately actuate the attached alarm 182. The shell detachable portion 111 may be separated from the shell rear side 114b by separating the hooks 111b from the apertures 114c so the shell interior cavity 119 and the outlet structure interior cavity 125 may be thoroughly and easily cleaned.

If the outlet structure defines a plurality of separate interior cavities as shown in FIGS. 15-18, the user may manipulate the switch 164 to move the diverter upright wall 162 between the first and second configurations 160a, 160b to select which interior cavity 125 the user wishes to access. In doing so, the user may easily separate items, such as trash and recyclables.

It is understood that while certain forms of this invention have been illustrated and described, it is not limited thereto except insofar as such limitations are included in the following claims and allowable functional equivalents thereof.

What is claimed is as follows:

1. A collection device for use with a bag, comprising:
   a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween; and
   an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit;
   wherein a lip is connected to the outlet structure bottom end and protrudes upwardly therefrom, whereby forming a groove; and
   further comprising a hoop encircling the outlet structure, the hoop being movable between a first position in which the hoop is separate from the groove and a second position in which the hoop is received in the groove for selectively ensnaring the bag between the hoop and the groove.

2. The collection device as in claim 1, wherein the outlet structure bottom end has a perimeter that is larger than a perimeter of the outlet structure top end.

3. A collection device for use with a bag, comprising:
   a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween; and
   an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit;
   wherein a lip is connected to the outlet structure bottom end and protrudes upwardly therefrom, whereby forming a groove; and
   further comprising a pivoting lever attached to the outlet structure, the lever being pivotable between a first position in which the lever is separate from the groove and a second position in which the lever is entrapped in the groove for selectively ensnaring the bag between the lever and the groove.

4. A collection device for use with a bag, comprising:
   a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween; and
   an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit;
   wherein a lip is connected to the outlet structure bottom end and protrudes upwardly therefrom, whereby forming a groove; and
   further comprising a lever pivotably attached to the outlet structure, the lever having an upper portion rotatably attached to a lower portion, the lever being movable between a first position in which a bottom surface of the lower portion is separate from the groove and a second position in which the lower portion bottom surface is received in the groove for selectively ensnaring the bag between the lower portion bottom surface and the groove.

5. A collection device for installation in a room having a wall, the collection device comprising:

a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween; and an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit;

wherein the left and right shell sides respectfully define a plurality of pilot holes for allowing the left and right shell sides to be easily attached to the wall.

6. The collection device as in claim 5, further comprising a plurality of fasteners, each fastener having a configuration complementary to a configuration of a respective pilot hole to connect the shell to the wall.

7. The collection device of claim 5, wherein the outlet structure defines a plurality of separate interior cavities, each outlet structure interior cavity being in selective communication with the shell interior cavity.

8. The collection device of claim 5, further comprising:

a door attached to the shell for selectively closing the shell front opening;

a hinge connected to an interior surface of the shell top end and connected to an interior surface of the door for allowing the door to selectively pivot about the hinge;

a pneumatic cylinder connected to an interior surface of the shell top end and an interior surface of the door for causing the door to selectively pivot about the hinge; and a motion sensor in communication with the pneumatic cylinder for selectively actuating the pneumatic cylinder.

9. A collection device for installation in a room having a wall, comprising:

a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween; and an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit;

wherein the front side has a vertical portion and an angled portion; and wherein the front side vertical portion defines the front opening;

further comprising a trim piece having a configuration complementary to a configuration of the shell front side vertical portion for integrating the shell front side vertical portion with the wall.

10. The collection device of claim 9, wherein the outlet structure defines a plurality of separate interior cavities, each outlet structure interior cavity being in selective communication with the shell interior cavity.

11. The collection device of claim 9, further comprising:

a door attached to the shell for selectively closing the shell front opening;

a hinge connected to an interior surface of the shell top end and connected to an interior surface of the door for allowing the door to selectively pivot about the hinge;

a pneumatic cylinder connected to an interior surface of the shell top end and an interior surface of the door for causing the door to selectively pivot about the hinge; and a motion sensor in communication with the pneumatic cylinder for selectively actuating the pneumatic cylinder.

12. A collection device for installation in a room having a wall, comprising:

a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween; and an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit;

wherein the front side has a vertical portion and an angled portion; and wherein the front side vertical portion defines the front opening;

further comprising a splashguard laterally adjacent the shell front side vertical portion for shielding the wall.

13. The collection device as in claim 12, wherein the splashguard includes indicia engraved by laser etching.

14. The collection device of claim 12, wherein the outlet structure defines a plurality of separate interior cavities, each outlet structure interior cavity being in selective communication with the shell interior cavity.

15. The collection device of claim 12, further comprising:

a door attached to the shell for selectively closing the shell front opening;

a hinge connected to an interior surface of the shell top end and connected to an interior surface of the door for allowing the door to selectively pivot about the hinge;

a pneumatic cylinder connected to an interior surface of the shell top end and an interior surface of the door for causing the door to selectively pivot about the hinge; and a motion sensor in communication with the pneumatic cylinder for selectively actuating the pneumatic cylinder.

16. A collection device, comprising:

a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween; and an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit;

wherein the shell rear side includes a detachable portion;

wherein an interior surface of the detachable portion defines a plurality of hooks;

wherein the shell rear side defines a plurality of apertures; and wherein each hook has a configuration complementary to a configuration of a respective aperture for selective engagement therewith.

17. A collection device, comprising:

a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween;

an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit; wherein a lip is connected to the outlet structure bottom end and protrudes upwardly therefrom, whereby forming a groove;

at least one of:
 (a) a hoop encircling the outlet structure, the hoop being movable between a first position in which the hoop is separate from the groove and a second position in which the hoop is received in the groove for selectively ensnaring the bag between the hoop and the groove;
 (b) a pivoting lever attached to the outlet structure, the lever being pivotable between a first position in which the lever is separate from the groove and a second position in which the lever is entrapped in the groove for selectively ensnaring the bag between the lever and the groove; or
 (c) a lever pivotably attached to the outlet structure, the lever having an upper portion rotatably attached to a lower portion, the lever being movable between a first position in which a bottom surface of the lower portion is separate from the groove and a second position in which the lower portion bottom surface is received in the groove for selectively ensnaring the bag between the lower portion bottom surface and the groove;

a door attached to the shell for selectively closing the shell front opening; and a hinge connected to an interior surface of the shell top end and connected to an interior surface of the door for allowing the door to selectively pivot about the hinge.

18. The collection device as in claim 17, further comprising a pneumatic cylinder connected to an interior surface of the shell top end and an interior surface of the door for causing the door to selectively pivot about the hinge.

19. The collection device as in claim 18, further comprising a motion sensor in communication with the pneumatic cylinder for selectively actuating the pneumatic cylinder.

20. A collection device, comprising:

a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween;

an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit; and a diverter between the shell front opening and the outlet structure exit, the diverter having:
 an upright wall selectively movable between first and second configurations; and
 a switch in communication with the upright wall for selectively moving the upright wall between the first and second configurations.

21. The collection device as in claim 20, wherein:

the outlet structure defines a plurality of separate interior cavities, each outlet structure interior cavity being in selective communication with the shell interior cavity;

the first diverter configuration provides access to one of the outlet structure cavities from the shell interior cavity; and the second diverter configuration provides access to another of the outlet structure cavities from the shell interior cavity.

22. A collection device, comprising:

a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween; and an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit; wherein a lip is connected to the outlet structure bottom end and protrudes upwardly therefrom, whereby forming a groove;

at least one of:
- (a) a hoop encircling the outlet structure, the hoop being movable between a first position in which the hoop is separate from the groove and a second position in which the hoop is received in the groove for selectively ensnaring the bag between the hoop and the groove;
- (b) a pivoting lever attached to the outlet structure, the lever being pivotable between a first position in which the lever is separate from the groove and a second position in which the lever is entrapped in the groove for selectively ensnaring the bag between the lever and the groove; or
- (c) a lever pivotably attached to the outlet structure, the lever having an upper portion rotatably attached to a lower portion, the lever being movable between a first position in which a bottom surface of the lower portion is separate from the groove and a second position in which the lower portion bottom surface is received in the groove for selectively ensnaring the bag between the lower portion bottom surface and the groove;

a sensor positioned in the outlet structure interior cavity for sensing when the bag is full; and an alarm in communication with the sensor for signaling when the bag is full.

23. The collection device of claim 22, further comprising:
a door attached to the shell for selectively closing the shell front opening;
a hinge connected to an interior surface of the shell top end and connected to an interior surface of the door for allowing the door to selectively pivot about the hinge;
a pneumatic cylinder connected to an interior surface of the shell top end and an interior surface of the door for causing the door to selectively pivot about the hinge; and
a motion sensor in communication with the pneumatic cylinder for selectively actuating the pneumatic cylinder.

24. A collection device for installation in a room having a wall, the collection device comprising:
a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween;
an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit; and
indicia located on the left and right shell sides for aligning the left and right shell sides with the wall;
wherein the shell front side has a vertical portion and an angled portion;
wherein the shell front side vertical portion defines the front opening; and
wherein the indicia are parallel to the shell front side vertical portion and are spaced between 3/8 inch and 1 inch from the shell front side vertical portion.

25. A method of discarding waste from a countertop in a first room to a remote room, comprising:
providing a collection device that comprises:
a shell having opposed top and bottom ends, opposed front and rear sides, and opposed left and right sides, the front side defining a front opening, the bottom end defining a lower opening, an interior cavity connecting the front opening and the lower opening for allowing the passage of items therebetween, the left and right sides respectfully defining a plurality of pilot holes for allowing the left and right shell sides to be easily attached to the wall;
an outlet structure having top and bottom ends, the outlet structure top end being attached to the shell bottom end and encircling the shell lower opening, the outlet structure extending downwardly from the shell, the outlet structure top end defining an upper opening, the outlet structure bottom end defining an exit, an interior cavity connecting the outlet structure upper opening and the outlet structure exit for allowing the passage of items therebetween, the outlet structure interior cavity being in communication with the shell interior cavity for allowing the passage of items between the shell front opening and the outlet structure exit; and
a door attached to the shell for selectively closing the shell front opening;
aligning the left and right shell sides with a wall;
aligning a bottom surface of the shell front opening with a top of the counter top;
coupling the left and right shell sides with the wall using fasteners, each fastener having a configuration complementary to a configuration of a respective pilot hole;
opening the door; and
sliding the waste from the countertop into the shell interior cavity.

* * * * *